United States Patent
Patton

[15] 3,692,182
[45] Sept. 19, 1972

[54] APPARATUS FOR FORMING AND CUTTING FILTER CAKE

[72] Inventor: Wilbur L. Patton, Wilmington, Del.
[73] Assignee: E. I. du Pont de Nemours and Company, Wilmington, Del.
[22] Filed: March 16, 1971
[21] Appl. No.: 124,699

[52] U.S. Cl. ................210/386, 210/396, 210/456
[51] Int. Cl. .......................B01d 33/02, B01d 33/38
[58] Field of Search......210/386, 396, 397, 400, 401, 210/405, 436

[56] References Cited

UNITED STATES PATENTS

| | | |
|---|---|---|
| R21,201 | 9/1939 | Quiller................210/386 X |
| 2,060,896 | 11/1936 | Raisch...................210/386 |
| 2,198,912 | 4/1940 | Fedeler, Jr..............210/386 |
| 2,229,582 | 1/1941 | Merrill................210/386 X |
| 2,936,073 | 5/1960 | Thompson............210/386 X |

Primary Examiner—John Adee
Attorney—Donald A. Hoes

[57] ABSTRACT

Apparatus is described for deliquifying a slurry of particulate material, especially acicular pigments and fillers, to form a continuous, low-moisture, filter cake which is then cut in the longitudinal direction to form pieces suitable for rapid drying. The cutting is effected by passing the filter cake between a pair of rolls, one of which is provided with a series of spaced circular cutting edges.

5 Claims, 4 Drawing Figures

FIG. I
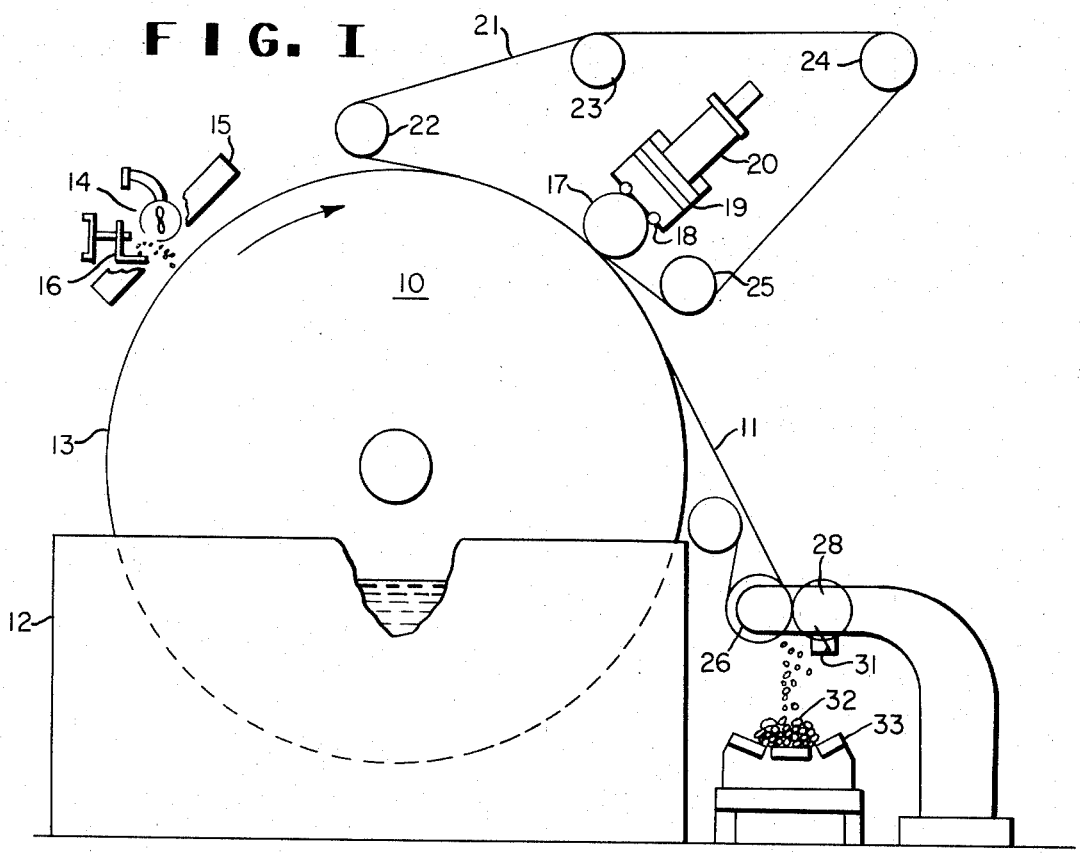
FIG. II
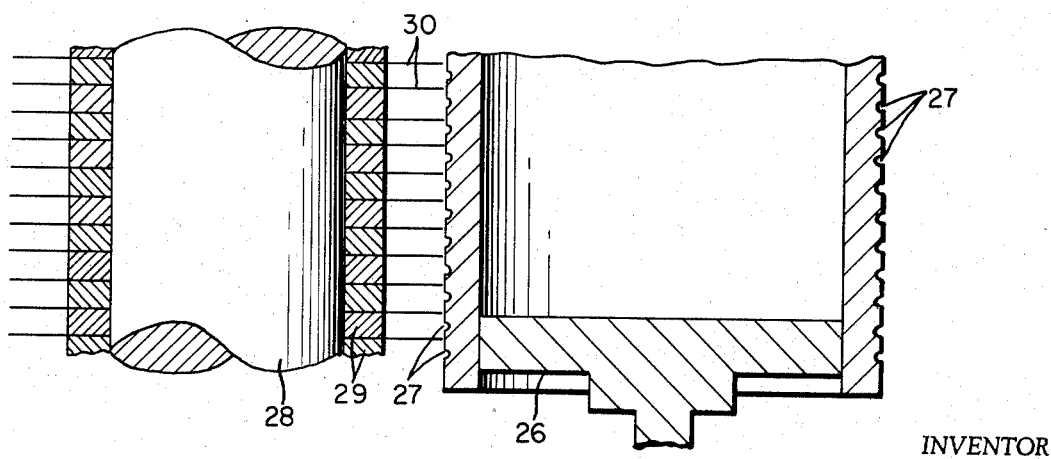
INVENTOR
WILBUR L. PATTON
BY　Donald A. Hoes
ATTORNEY

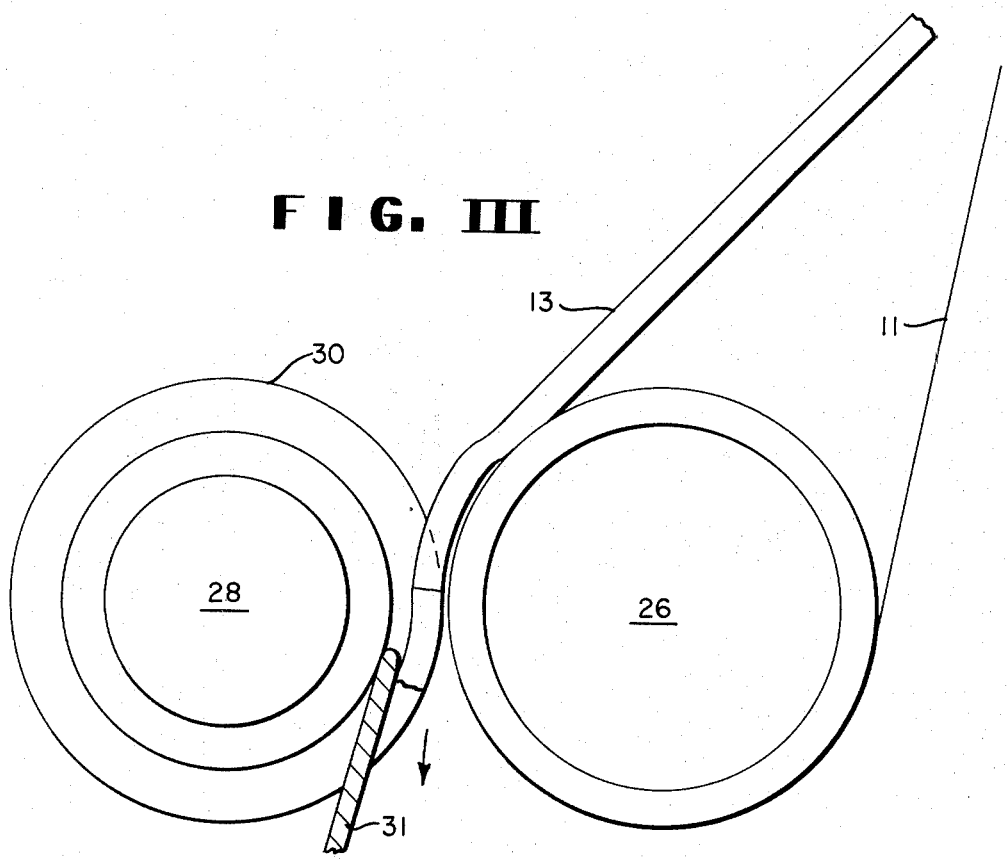
FIG. III
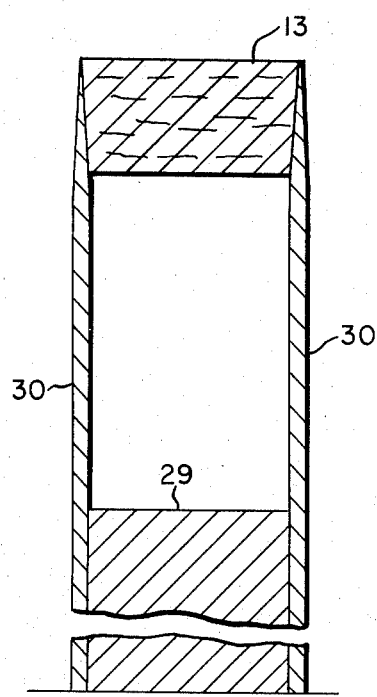
FIG. IV
INVENTOR
WILBUR L. PATTON
BY  Donald A. Hoes
ATTORNEY

APPARATUS FOR FORMING AND CUTTING FILTER CAKE

BACKGROUND OF THE INVENTION

Various types of apparatus have heretofore been described in which an aqueous slurry is dewatered to yield a solidified mass which is then formed, e.g., extruded, into pellets or other suitable size pieces that will undergo a subsequent drying step. While suitable for many materials, such apparatus has proven to be unsatisfactory when used in connection with acicular materials, e.g., acicular potassium titanate pigments, owing, apparently, to the peculiar morphology of these particles. More specifically, there is a tendency for such a material to agglomerate in the form of undesired grit when subjected to the action of strong mechanical forces of the type encountered in the usual dewatering procedures. It will be understood that the virtual elimination of grit, as is essential for a high quality pigment, cannot suitably be accomplished by a grinding procedure as this would tend to destroy the acicular nature of the particles.

SUMMARY OF THE INVENTION

In accordance with the invention there is provided an apparatus for deliquifying a slurry of particulate material, advantageously an aqueous slurry of acicular particles. The apparatus is composed of a rotary vacuum filter for producing a continuous filter cake, a cutter assembly for longitudinally sectioning the filter cake, and a string discharge for conveying the filter cake from the rotary vacuum filter to the cutter assembly. The cutter assembly comprises a pair of parallel rotatably mounted rolls positioned to engage the filter cake therebetween, one of the rolls being a cutter roll having a series of spaced circular cutting edges positioned to penetrate and sever the filter cake. The second of the two rolls is grooved for receiving the strings of the string discharge thereby to guide the filter cake to a position of engagement between the rolls. Preferably, the rotatably mounted rolls are positioned relative to the string discharge so as to direct the filter cake against the cutting roll in nontangential relationship. In any event a doctor blade will assist in ejecting sectioned portions of the filter cake from between the spaced cutting edges of the cutter roll.

The apparatus of the invention enables the highly efficient provision of a low-moisture content product which, in the case of an acicular material, is exceptionally low in grit content owing to the reduced amount of work which has been performed on the filter cake. The requirement for dry milling of the product is thereby reduced, or eliminated altogether, such that fiber breakage is also reduced.

Although the apparatus of this invention is particularly applicable for processing slurries of finely divided solids wherein the primary particles are of acicular morphology and pigmentary size, such as potassium titanate and rutile, it is also useful with other acicular and non-acicular materials of various sizes if they have a reasonable cohesive strength for purposes of maintaining cake integrity in transport to and through the cutting operation.

DETAILED DESCRIPTION OF THE INVENTION

A full understanding of the invention and its advantages will be gained by the following detailed description and consideration of the drawings in which:

FIG. I is a schematic cross-sectional view of the apparatus.

FIG. II is a partial enlarged view of a portion of the cutter assembly in longitudinal cross-section.

FIG. III is an enlarged cross-sectional view of the cutter assembly showing the doctor or comb for ejecting the cut sections of filter cake.

FIG. IV is an enlarged longitudinal cross-sectional view of the cutter blades with a section of cut filter cake being held under compression therebetween.

Referring to FIG. I, a rotary vacuum filter 10, which may be of the Oliver type, is driven by means, not shown. A filter cake of acicular pigmentary material is formed in the normal manner by suction applied internally, not shown, through a filter cloth positioned on the periphery of the drum while rotating through the slurry contained in filter tank 12. After the cake 13 has been formed and substantially dewatered, additional slurry is directed on to the filter cake by means of a slotted, pressurized pipe 14 provided with an agitator, to seal the cracks that may develop in the cake so as to prevent loss of vacuum. The slurry feed pipe, which is positioned several inches from the drum filter cloth with its longitudinal axis parallel to the axis of rotation of the filter, is provided with an adjustment mechanism, not shown, whereby it can be varied in position within a support or mounting frame 15. Advantageously the angular elevation of the slurry pipe on the drum relative to the horizontal is between 30° to 60°, the optimum angle depending on the dewatering rate and the thickness of cake desired. The slot in the slurry pipe is oriented such that the slurry stream is directed tangentially backward against an angle iron 16 provided with an attitude adjustment mechanism, not shown. Angle iron 16 serves as a means of spreading the slurry flow and reducing the velocity of the stream so that the freshly formed cake on the drum is not eroded. Relative positioning of angle iron 16 also enables the slurry stream to be directed to a desired position on the filter cake.

To smooth and further dewater the cake, compression roll 17 is positioned across the cake surface at a point prior to the release of vacuum and cake discharge. Force is applied to compression roll 17 through two sets of adjustable support rolls 18. The support rolls are mounted on frame 19 which is constrained to move normal to the surface of the cake by slot and key means, not shown, at the ends of the frame. Pressure on the frame and support rolls is varied by an air cylinder 20, and transmitted to compression roll 17 and thence to the cake through a porous endless belt of a laminated polyester fiber felt 21, which travels on idler rolls 22, 23, 24, 25 supported by an external frame, not shown. The felt serves to support cake 13 and exert gentle compression prior to contact with the compression roll 17, and prevents adherence of the cake thereto.

It should be appreciated that premature cracking of the cake is undesirable and that, while the diameter of compression roll 17 and its loading are selected to avoid cracking, other factors such as cake thickness and the nature of the particulate material will also have considerable influence. A compression roll that is excessively large in diameter gives a low unit loading on the cake, whereas a small diameter roll produces shearing forces tending to crack the cake. For a three-eighths inch thick cake of pigmentary potassium titanate, a 10 ½ inch diameter roll with a loading of 500–1,000 lbs. per ft. of cake in contact with the rolls is considered desirable.

When the cake is compressed and discharged, it is ready for passage to the cutter assembly which is composed of pivot roll 26 and cutter roll 28. This is accomplished by means of a string discharge in which a series of strings 11 pass continuously from a position underneath the filter cake while it is on the filter 10, about roll 26, and back to the filter. Pivot roll 26 has grooves 27 for guiding the strings and maintaining them at a uniform spacing. Cutter roll 28 is provided with a series of circular cutting edges spaced at regular intervals. The relationship between pivot roll 26 and cutter roll 28 is shown in more detail in FIGS. II and III. Grooves 27 for guiding the strings are centrally located between the cutting discs 30 which are separated by spacers 29. Spacers 29, which determine the width of the pieces of filter cake desired, may be ½ to 1 ½ inch wide although three-fourths inch spacers have been found advantageous for cutting cake of pigmentary potassium titanate.

Pivot roll 26 is preferably constructed of polished, chrome-plated steel to minimize adhesion of the wet cake. Grooves 27 are cut with circular segmentary cross sections to prevent accumulation of filter cake by the lateral movements of the strings within the grooves. A small separation, generally no more than 0.10 inch, is maintained between the outer edge of cutting blade and pivot roll 26 to avoid wear on the latter. Pivot roll 26 is driven only by the movement of strings 11, which in turn are driven by the rotary filter 10. Cutter roll 28 also has no separate drive means, being caused to rotate merely by the filter cake 13 which is being pressed thereagainst.

Cake 13 is fed on the strings, about the periphery of pivot roll 26 for a short distance so as to be forced nontangentially against cutters 30. As shown more clearly in FIG. III, this results in the cutting edges knifing cleanly into and through the cake. At the same time the slight resistance of cutter roll 28 to rotation results in a force which tends to lift the cake off the strings and eliminate any tendency to adhere to pivot roll. The result is that the cake is cut into regular longitudinal sections with, at most, only a small percentage being reduced to the particulate state.

The cut cake is held temporarily between cutting discs 30 until it is forced against the finger 31 of an adjustable doctor or comb, whereby the cake is broken and ejected, dropping as pieces 32 to a collector 33. The length of the pieces 32 can be regulated by suitable positioning of the fingers 31.

As shown in FIG. IV, cutting discs 30 are tapered at the edge. As the cake is forced between the discs it is therefore compressed. In the case of a resilient cake such as pigmentary potassium titanate, this serves to firmly hold the section portions in position until ejected by the doctor. Discs 30 are preferably fabricated of one-sixteenth inch carbon steel or stainless steel and are chrome-plated for wear resistance. Cutters coated with fluorocarbon resin produce fewer fines but the coating tends to separate from the blade edges after a period of time. The diameter of the discs should be relatively large to avoid premature breakage by sharp changes in curvature induced in the cake during cutting and transfer. In actual operation, 12 inch O.D. blades have been found satisfactory.

Operation of the apparatus of the invention will be understood from the following specific example.

An aqueous slurry containing 2 ½ percent by weight of acicular pigmentary potassium titanate produced according to the process of U.S. Pat. No. 3,328,117 was dewatered using an apparatus of the type depicted in the Figures. The rotary drum, measuring 3 feet in diameter and 1 foot across the face, had a porous peripheral surface through which suction was applied. Positioned above the drum was a top feed for sealing the cake and a compression roll. A string discharge was provided to separate the dewatered pigment and convey it to the cutter assembly. While maintaining a vacuum of 19 inches Hg by top sealing and 450 lbs. compression per lineal inch of cake by means of the compression roll, a one-fourth inch filter cake was produced containing only 3.3 lbs. water per lb. of solids at a rate of 19.3 lbs./hr./ft$^2$. of filter surface. Dewatering was considerably improved as compared to a rotary vacuum filter not provided with top feeding, compression roll, or string discharge. Rhombohedral pieces ¼ inch by ¾ inch by 1 to 3 inches in length were cut from the filter cake. The rod-like shape of pieces enabled them to be dried at highly efficient rates. A final crushing and light milling yielded a high quality acicular potassium titanate pigment.

What is claimed is:

1. Apparatus for deliquifying a slurry of particulate material comprising a rotary vacuum filter for producing a continuous filter cake, a cutter assembly for longitudinally sectioning the filter cake, and a string discharge operatively connecting the rotary vacuum filter to the cutter assembly, the cutter assembly comprising a pair of parallel rotatably mounted rolls positioned to engage the filter cake therebetween, one of said rolls being cutter roll having a series of spaced circular cutting edges positioned to penetrate and sever the filter cake.

2. Apparatus according to claim 1 wherein the other of said rotary mounted rolls is grooved for receiving the strings of the string discharge thereby to guide the filter cake to a position of engagement between said rolls.

3. Apparatus according to claim 2 wherein the rotatably mounted rolls are positioned relative to the string discharge so as to direct the filter cake against said cutting edges in non-tangential relationship.

4. Apparatus according to claim 3 further including doctor means for ejecting sectioned portions of filter cake from between said spaced cutting edges.

5. Apparatus according to claim 1 wherein the rotary vacuum filter includes means for top feeding a portion of the slurry to seal the cake and compression means for compacting the filter cake.

* * * * *